(12) United States Patent
Gundry

(10) Patent No.: US 6,382,247 B1
(45) Date of Patent: May 7, 2002

(54) DRY SECTIONAL GATE RELIEF VALVE

(75) Inventor: David K. Gundry, Jaffrey, NH (US)

(73) Assignee: Task Force Tips, Inc., Valparaiso, IN (US)

( * ) Notice: Subject to any disclaimer, the term of this patent is extended or adjusted under 35 U.S.C. 154(b) by 0 days.

(21) Appl. No.: 09/541,065

(22) Filed: Mar. 31, 2000

(51) Int. Cl.⁷ ............................................. F16K 37/00
(52) U.S. Cl. ............................... 137/556.3; 251/249.5; 251/309
(58) Field of Search ........................... 137/556, 556.3, 137/556.6, 881, 882, 878; 251/249.5, 304, 309

(56) References Cited

U.S. PATENT DOCUMENTS

| | | | |
|---|---|---|---|
| 2,051,307 A | * | 8/1936 | Lorraine ............... 137/556.3 X |
| 3,520,513 A | | 7/1970 | Okerblom |
| 3,714,968 A | | 2/1973 | Billeter |
| 3,893,469 A | * | 7/1975 | Baker ...................... 251/309 X |
| 4,050,857 A | * | 9/1977 | Leach ............... 137/115.16 X |
| 4,074,889 A | | 2/1978 | Engel |
| 4,076,211 A | | 2/1978 | Krechel et al. |
| 4,718,444 A | | 1/1988 | Boelte |
| 4,749,002 A | * | 6/1988 | Lembser ...................... 137/212 |
| 4,760,989 A | * | 8/1988 | Elliott et al. ......... 251/249.5 X |
| 4,822,000 A | | 4/1989 | Bramblet |
| 4,848,398 A | | 7/1989 | Leach |
| 5,178,185 A | | 1/1993 | Stehling et al. |
| 5,188,335 A | | 2/1993 | Pettinaroli |
| 5,533,549 A | | 7/1996 | Sherman |
| 5,551,479 A | | 9/1996 | Graves |

* cited by examiner

Primary Examiner—Kevin Lee
(74) Attorney, Agent, or Firm—Pearson & Pearson, LLP

(57) ABSTRACT

An intake relief valve comprises a bronze sectional gate positioned within the valve chamber adjacent to an outlet section of the valve. A quick attachment coupler of the valve connects the outlet section typically to a pumper fire truck, and a hose from a hydrant or draft source connects to an opposite inlet section of the valve. When the valve is closed and the hose is disconnected from the valve with the valve connected to the pumper fire truck, there is no water remaining in the valve chamber. Any residual water is released by a pit drainage outlet on the bottom wall of the valve. Not having water stored in the valve eliminates corrosion problems within the valve, when the valve is connected to the pumper fire truck.

15 Claims, 8 Drawing Sheets

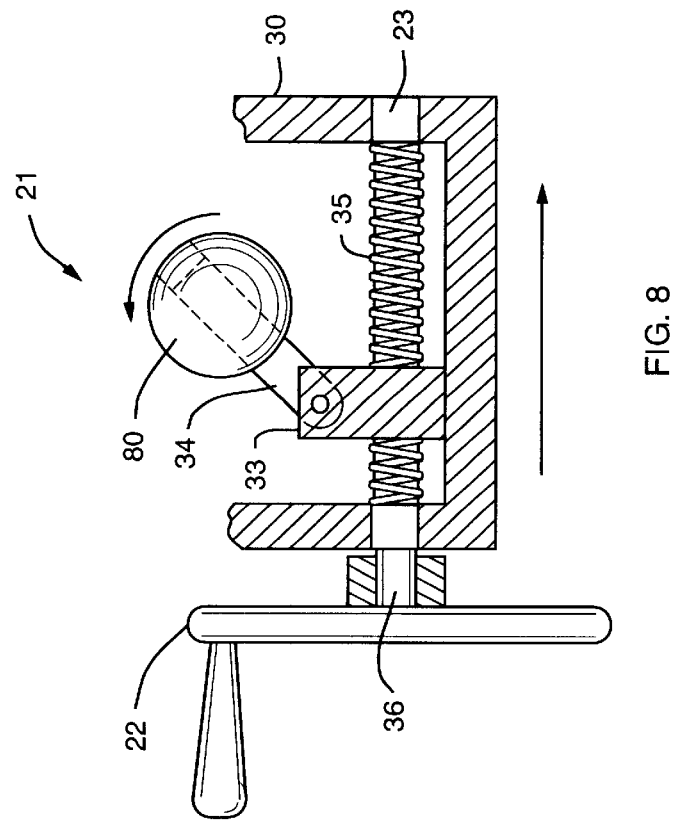
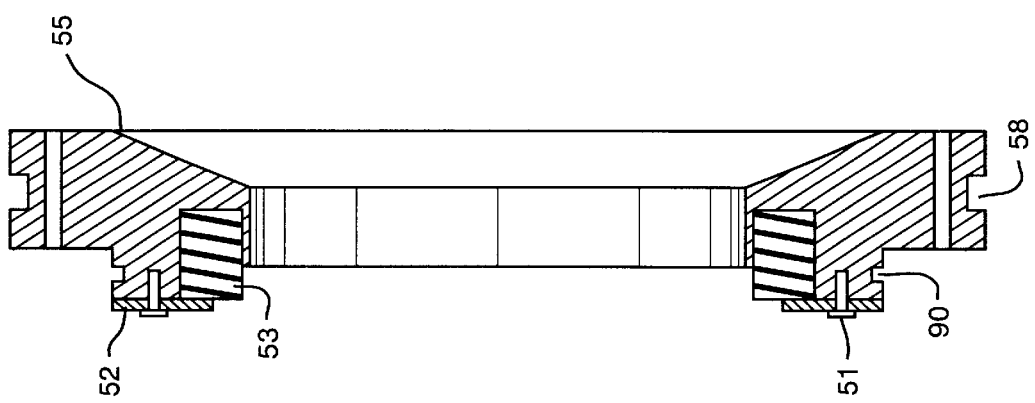

DRY SECTIONAL GATE RELIEF VALVE

BACKGROUND OF THE INVENTION

1. Field of the Invention

The present invention relates to an intake valve generally for use on a pumper fire truck, and in particular to a relief valve having a sectional gate to open and close water flow at the pumper side or outlet section of the valve whereby no water remains in the valve when there is no connection to a water source at the inlet section of the valve.

2. Description of Related Art

It is well known to attach a gated relief valve to a pumper fire truck in order to quickly attach a water supply hose to the valve. However, when the water supply hose is disconnected from the valve, water remains in the valve chamber resulting in corrosion of the valve parts over a period of time.

In U.S. Pat. No. 5,178,185, issued Jan. 12, 1993 to Henry J. Stehling and Grady North and assigned to Hydra-Shield Manufacturing, Inc., a suction inlet valve for fire trucks pumpers is shown comprising a valve body having a chamber connected to inlet and outlet openings. A floating valve element within the chamber is positioned in alignment with inlet opening for movement between a fully closed position and a fully open position. A spring urges the floating valve element to the fully closed position leaving water within the chamber of the valve when the hose is disconnected but the valve is connected to the fire truck. Water left in the chamber results in corrosion over a period of time requiring maintenance of the valve more often.

In U.S. Pat. No. 4,848,398, issued Jul. 18, 1989 to Allen A. Leach and assigned to Jaffrey Fire Protection Company, Inc. A ball gate pressure relief valve is described having a gate in the form of a ball cock which rotates in horizontal plane on a vertical axis by means of a worm gear and wheel. When the ball cock is closed, water remains in the chamber of the valve resulting in corrosion of valve parts.

SUMMARY OF THE INVENTION

Accordingly, it is therefore an object of this invention to provide an intake relief valve having a dry chamber when there is no hose connected to an inlet section and the outlet section of the valve is attached to a pumper fire truck.

It is another object of the invention to provide an intake relief valve having a sectional gate adjacent to an outlet section of the valve.

It is a further object of the invention to provide a pit drainage outlet on the bottom wall of the valve to allow water from the after a hose is removed from the inlet port and leakeage to escape and to provide an indication of water leakage from the sectional gate adjacent to the outlet section.

It is another object of the invention to provide an actuator assembly for controlling the sectional gate comprising a worm gear with an actuator rod attached to a worm gear nut and extending through a slip hole in the barrel of a swivel pin which rotates the sectional gate.

These and other objects are accomplished by providing a relief valve comprising means on an inlet section for connecting the valve to a fluid source, means on an outlet section of the valve for connecting the valve to a suction source, means mounted inside the valve adjacent to the suction source connecting means, for controlling the flow of the fluid through the relief valve, the valve being dry when the valve is closed and connected to the suction source and not connected to the fluid source, and means positioned on the outside of the relief valve and connected to the flow controlling means for adjusting the position of the flow controlling means within the opening of the outlet section. The means on the inlet section of the valve comprises a quick attachment coupling. The means on the outlet section of the valve comprises a swivel nut for connection to the suction source. The means for controlling the flow of the fluid through the valve comprises an actuator section coupled to a sectional gate for controlling the flow of the fluid by opening and closing the sectional gate within the valve. The valve comprises a drain for releasing residual fluid when no hose is attached to the inlet section. The valve comprises means attached to a bottom portion of the valve for releasing pressure above a preset valve. The actuator section comprises a gear box, attached to a top portion of the valve, having a worm gear which rotates as a handwheel is turned. The gear box comprises means for turning an indicator on the outside of the gear box, the gear box including a cover with markings whereby the indicator shows whether the valve is "open", "partially open" or "closed".

The objects are further accomplished by a relief valve comprising a housing for providing a flow path for a fluid, an inlet section of the housing comprising a coupling for attaching a hose, an outlet section of the housing comprising a coupling for attaching the valve to a pumping source, a sectional gate mounted in the housing adjacent to the outlet section for opening and closing the flow path, the housing being dry when the sectional gate is closed, the valve is connected to the pumping source, and the valve is not connected to the hose at the inlet section, and an actuator section mounted on the housing for moving the sectional gate from an open to a closed position, the actuator section being coupled to a handwheel.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 7 is a cross-section side elevational view of the bronze swivel insert;

FIG. 8 is a partial cross-sectional rear view of the sectional gate actuator assembly;

DESCRIPTION OF ILLUSTRATIVE EMBODIMENT

Figure 1:
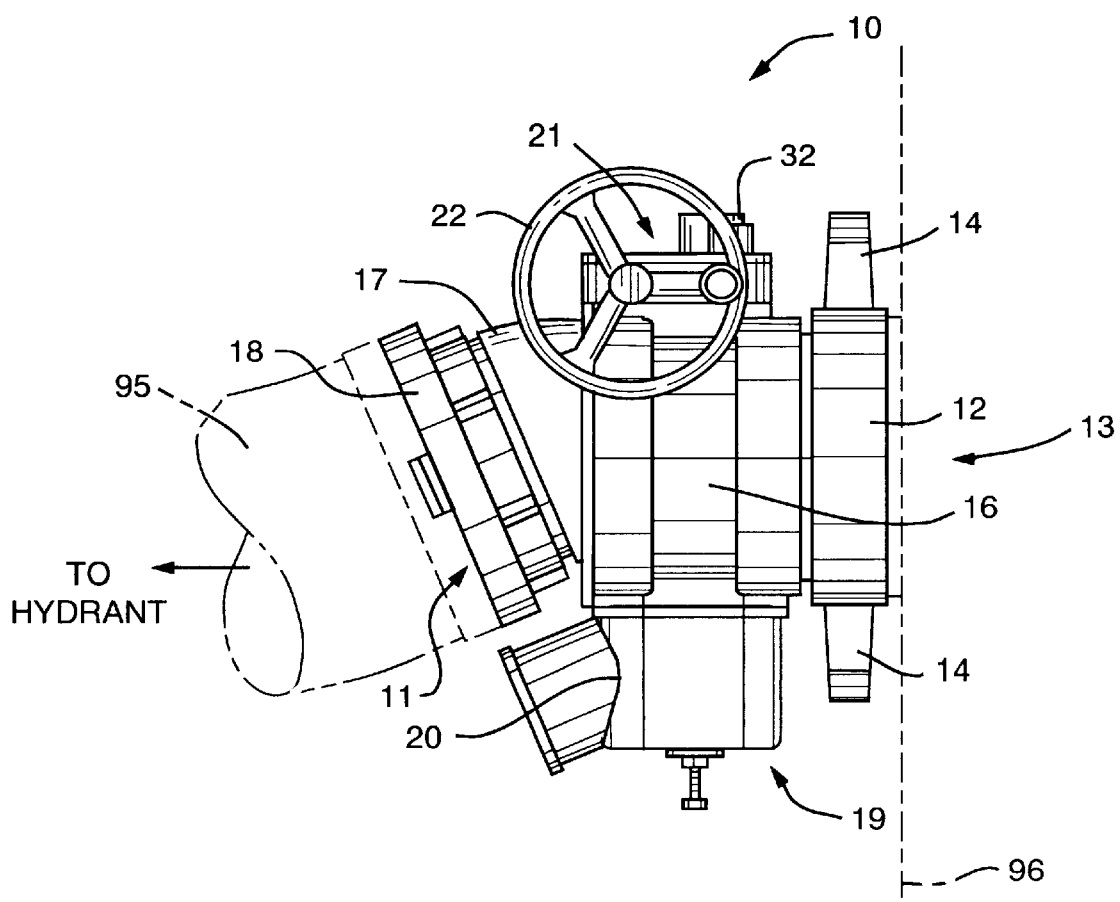
FIG. 1 is a side elevational view of the relief valve of the invention.
Figure 2:
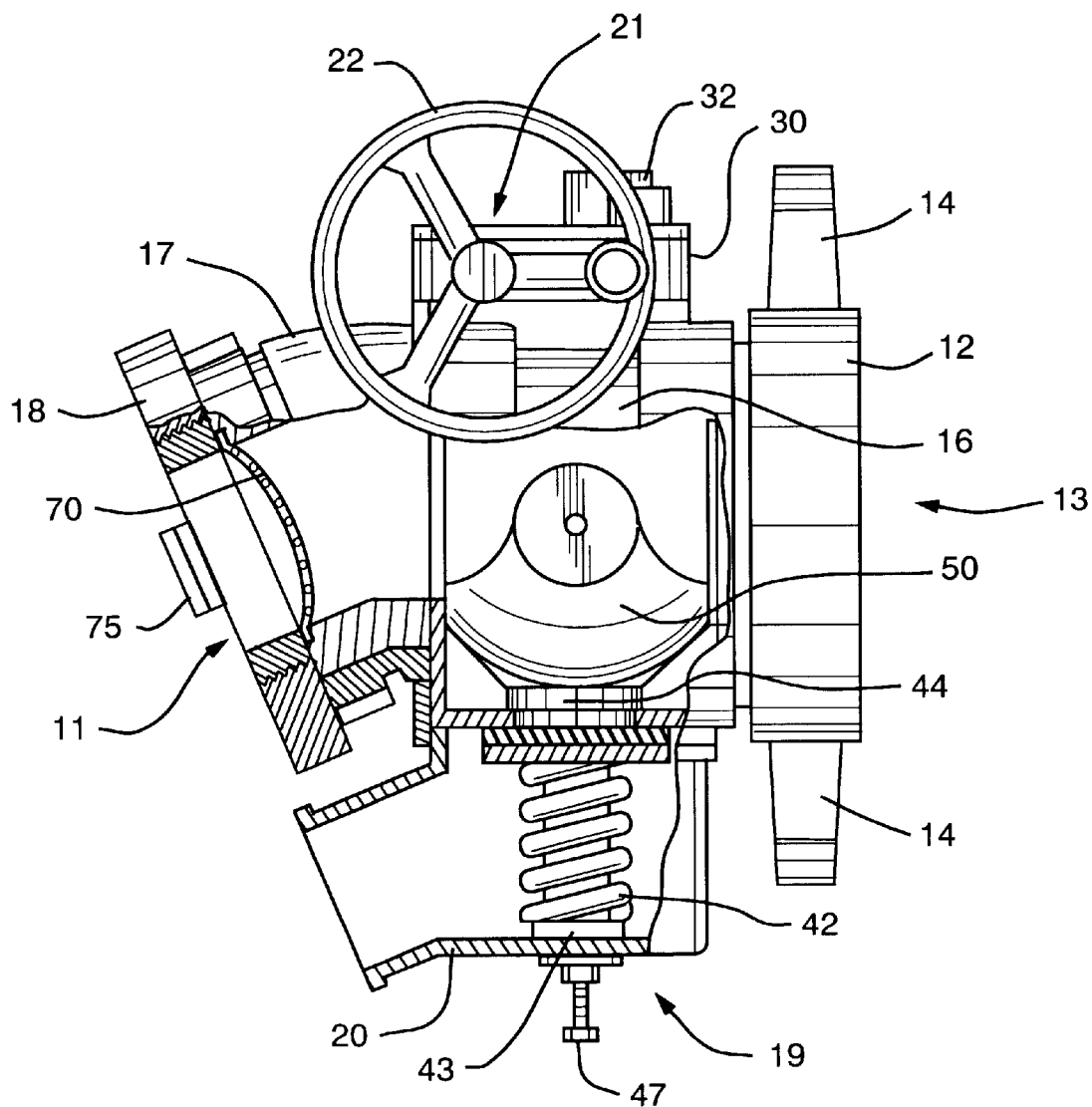
FIG. 2 is an enlarged, partial cross-section, side elevational view, similar to FIG. 1.

Referring to FIG. 1 and FIG. 2, FIG. 1 shows a side elevational view of a dry relief valve 10, and FIG. 2 shows an enlarged partial cross-sectional view of the invention comprising an inlet section 11, an outlet section 13, a pressure relief section 19 and an actuator section 21. When the valve 10 is in a closed position connected to a pumper fire truck 96 and there is no water source connected to the inlet section 11, the housing 16 is dry thereby eliminating corrosion problems.

Figure 6:
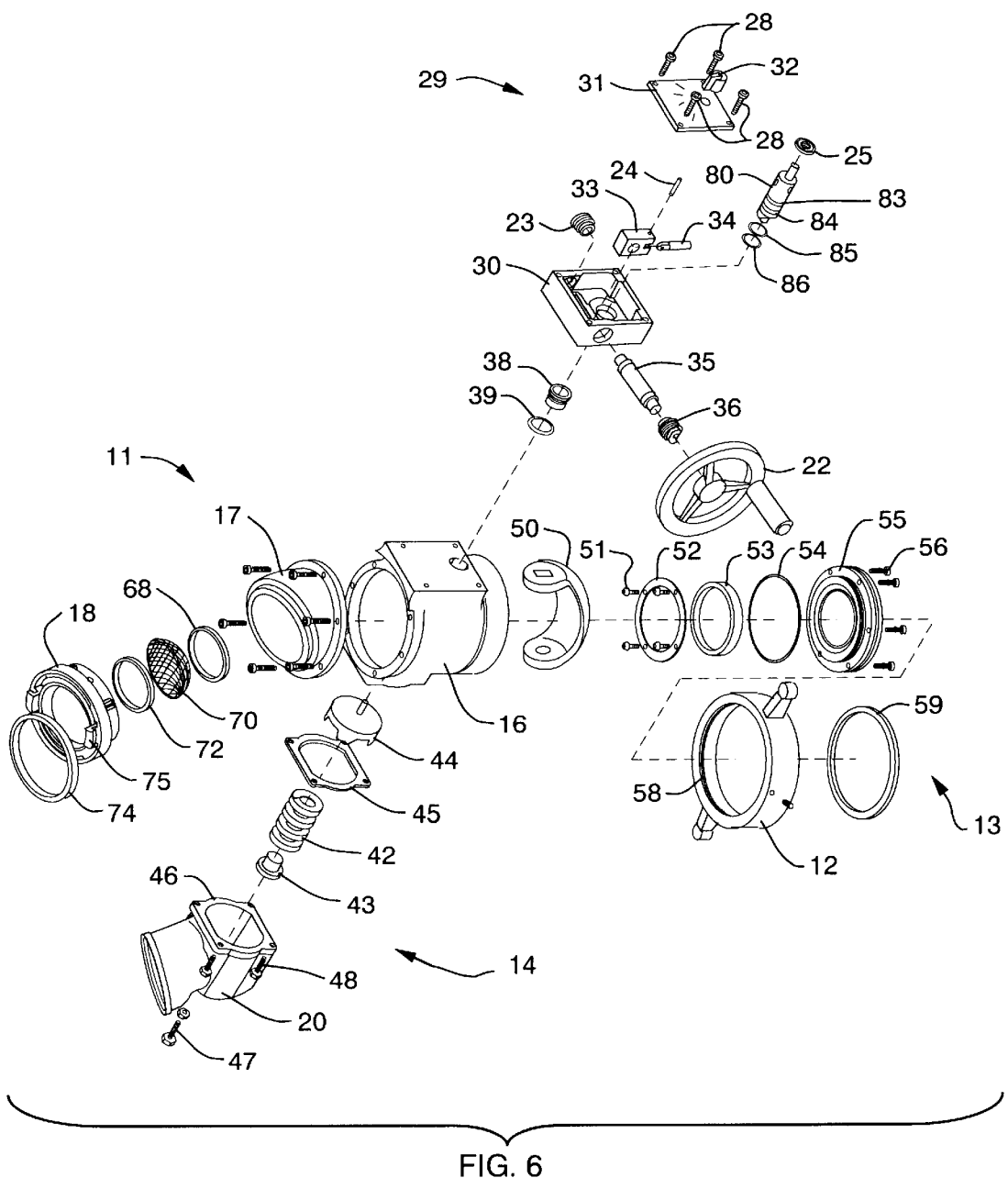
FIG. 6 is an exploded view showing the relationship of the parts of the valve.

Referring to FIGS. 1, 2 and 6, the inlet section 11 connects to a hose 95 extending from a source of water which is provided to the pumper fire truck 96 via valve 10. The inlet section 11 as shown in FIG. 1 comprises a Storz tight coupling 18 attached to an elbow 17 and the elbow 17 attaches to the main housing 16. One skilled in the art will recognize that the inlet section 11 could be embodied by a straight coupling instead of an elbow 17. Another configuration of an inlet section 11 includes a pressure relief valve (not shown) extending from the elbow 17. However, in the embodiment shown in FIG. 1, the pressure relief section 19 is positioned on the bottom of the main housing 16.

Figure 3:
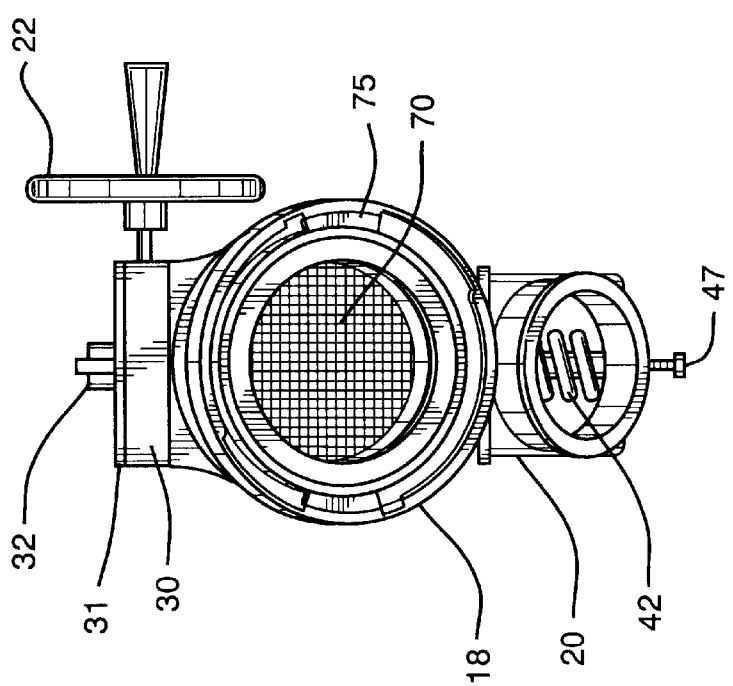
FIG. 3 is a front elevational view of the valve.

Referring to FIGS. 2, 3 and 6, FIG. 3 is a front elevational view of the relief valve 10 and FIG. 6 is an exploded view of the valve 10 showing the relationship of the parts in the valve 10. The Storz tight coupling 18 of the inlet section 11 comprises a flat gasket 72 positioned in front of a suction screen 70, which may be embodied by stainless steel, and adjacent to the inside surface of the Storz tight coupling 18. The other side of the suction screen 70 is disposed against a gasket 68 which is located adjacent to the outside portion of elbow 17.

Figure 4:
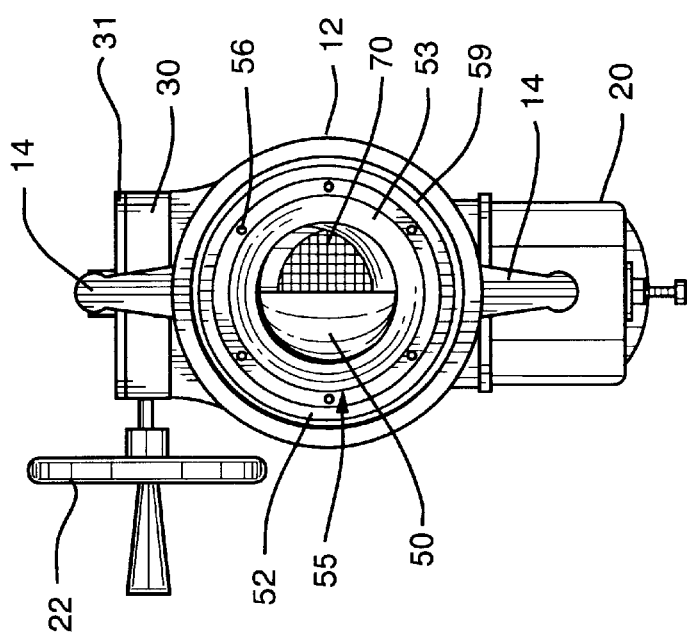
FIG. 4 is a rear elevational view of the valve.

Referring to FIGS. 1, 2, 4, 6 and 7, the outlet section 13 on an opposite side of the housing 16 of the valve 10 attaches to the pumper fire truck 96 by means of a swivel nut 12 having handles 14. FIG. 4 shows a rear elevational view of the relief valve 10 comprising a swivel nut 12 having a flat adapter gasket 59 positioned within the perimeter of the outside surface facing the pumper fire truck 96 and race balls 58 located within a groove around the inside periphery as shown in the exploded view of FIG. 6 of the invention. A bronze swivel insert 55 is positioned within the swivel nut 58 and secured by insert screws 56. FIG. 7 shows a side elevational view of the swivel insert 55. The inside surface of the swivel insert 55, shown in FIG. 6, comprises an insert O-ring 54, an insert gasket 53 and a seal face plate 52 which secures the insert gasket 53 to the swivel insert 55 with cap screws 51.

Referring again to FIG. 2 and FIG. 6, the pressure relief section 19 is located on the bottom of the housing 16 of valve 10. However, as pointed out above, it is known in the prior art that the pressure relief valve section 19 may also be located elsewhere on the valve 10 such as on top of the elbow 17. The pressure relief section 19 comprises a relief valve housing 20 which includes a relief valve helical spring 42 of predetermined strength with a relief valve spring retainer 43 under the spring 42 and a relief valve adjustment bolt 47 inserted in the bottom of the relief valve housing 20. On top of the relief valve spring 42 is a relief valve spider 44, and a gasket 45 is positioned between the main housing 16 and the relief valve housing 20. The relief valve housing 20 is secured to the main housing 16 by relief valve housing bolts 48.

The pressure relief valve section 19 is located out-board of the shut-off sectional gate 50 which provides pressure relief protection for the system while the supply hose 95, attached to the inlet section 11, is being charged (valve 10 closed) and also while the system is in full operation (valve 10 opened). The pressure relief valve section 19 is adjustable over the range of 10 psi to 200 psi by the adjustment bolt 47. One full turn of the adjustment bolt 47 changes the pressure setting by 25 psi.

Figure 5A:
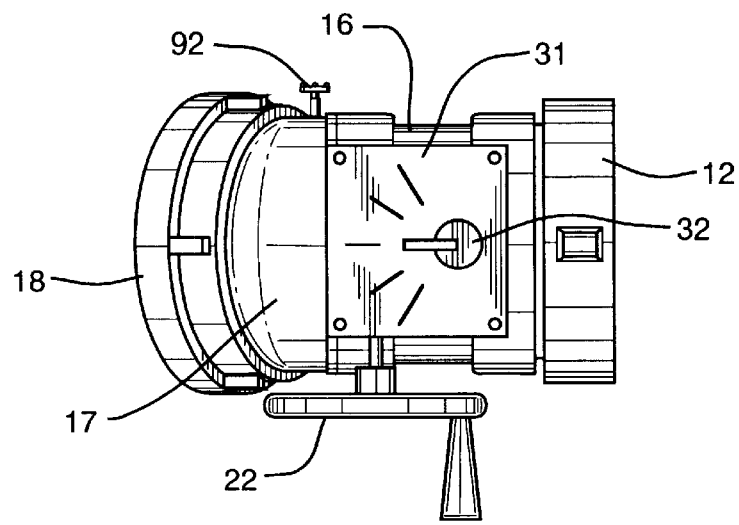
FIG. 5A is a top plan view of the valve.
Figure 5B:
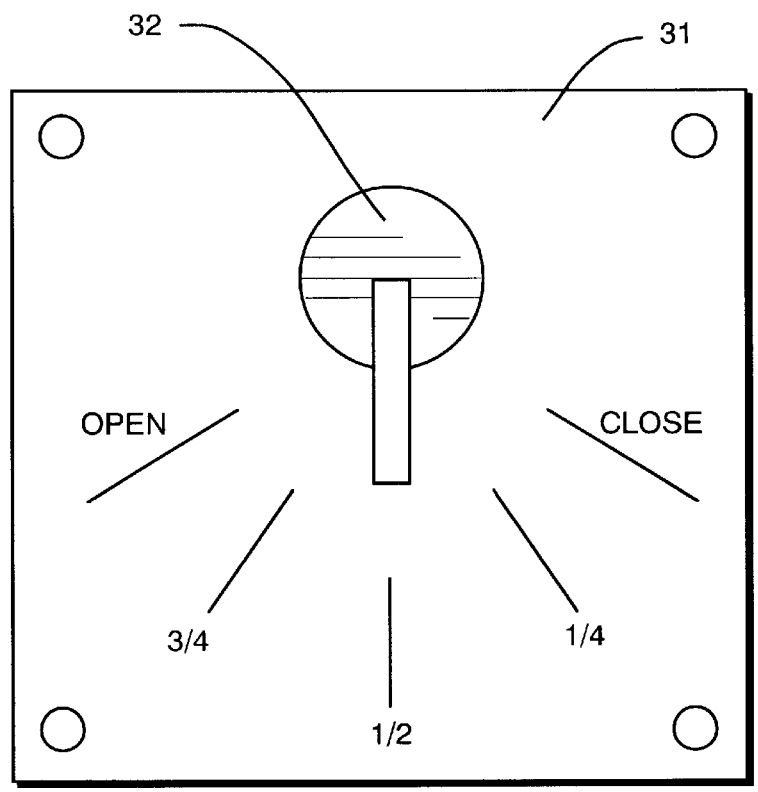
FIG. 5B shows the labeling on the cover of the gear box of FIG. 5A indicating the valve status.

Referring to FIG. 2, FIG. 5A, FIG. 5B and FIG. 6, the actuator section 21 comprises a sectional gate 50 positioned within the housing 16 and a gear box 30 comprising a worm gear 36 which moves as a wheel 22 is turned to rotate the sectional gate 50 within the housing 16. The sectional gate 50 is approximately a one-third section of a sphere instead of being a full sphere as are many prior art designs. The sectional gate 50 structure results in less weight and improved flow characteristics within valve 10. FIG. 5A shows a top plan view of the relief valve 10 comprising the cover 31 of gear box 30 and FIG. 5B shows the labeling on the cover 31 which indicates the valve 10 status such as OPEN, ¾, ½, ¼ or CLOSE. When the sectional gate 50 is in a closed position, water flow is prevented from entering the pumper fire truck 96. Also, when the sectional gate 50 is in the closed position, water from the pumper fire truck 96 cannot flow out into the housing 16 or the inlet section 11. In fact, when the hose 95 is removed from the Storz tight coupling 18, there is no water storage within the valve 10. Therefore, the valve 10 becomes dry as described herein before which eliminates corrosion problems typical with a wet valve which retains water within its valve housing 16. Further, the sectional gate 50 is made of bronze instead of, for example, aluminum as in many prior art valves.

When a pit drainage outlet 92 on the wall of the valve housing 16, as shown in FIG. 5A, is "opened", it allows any water leakage to drain out of the housing 16. Therefore, any water leakage from the sectional gate 50 is detected by observing water discharged from the pit drainage outlet 92. Of course the pit drainage outlet 92 would be "closed" when the valve 10 is connected to the hose 95 for operation with a pumper fire truck 96.

Referring now to FIGS. 4, 6 and 8, FIG. 8 is a partial cross-sectional, rear view of the actuator assembly 21 comprising the hand wheel 22 which attaches to the worm gear 35 in the gear box 30 via a threshold bushing 36 in a side wall of the gear box 30. The other end of the worm gear 35 attaches in an opposite wall of the gear box 35 to a bushing 23. A worm actuator nut 33 travels along the worm gear 35 as the handwheel 22 is turned such as from left to right as indicated by the arrow in FIG. 8. An actuator rod 34 has one end attached to the actuator nut 33 by means of a roll pin 22 and the other end of the actuator rod 34 is inserted into a slip hole 88 in an upper section of a swivel pin 80 (see FIG. 10A and FIG. 10B). The lower end key 89 of the swivel pin 80 extends through the top of the housing 16 at the key opening 97 and into the key opening 98 in the top portion of the sectional gate 50, and causes the sectional gate 50 to OPEN and CLOSE as the hand wheel 22 is rotated. The lower portion of the sectional gate is held in position and rotates via a trunion (not shown) in the bottom of the main housing 16.

Figure 9:
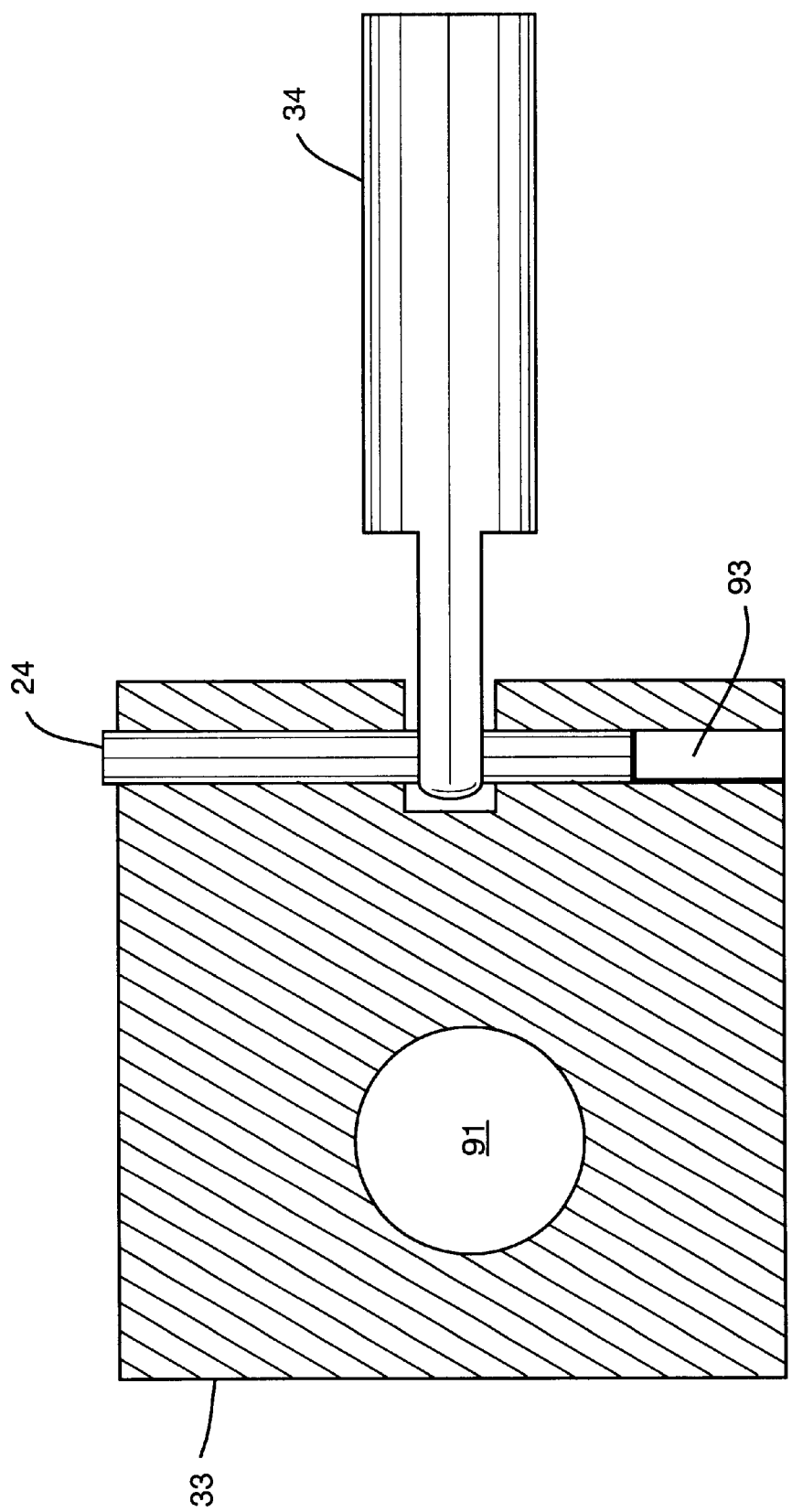
FIG. 9 shows an actuator rod attached to an actuator nut by a roll pin in the actuator assembly of FIG. 8.

Referring now to FIG. 8 and FIG. 9, FIG. 9 shows the worm actuator nut 33 having a hole 91 for insertion of the worm gear 35. The hole 91 is typically ⅝ inch inside diameter and threaded to work with the worm gear 35. The roll pin 24 secures the actuator rod 34 to the actuator nut 33 by means of the roll pin 33 being inserted into a cylindrical channel 93 of the actuator nut 33 and passing through a hole at one end of the actuator rod 34 as shown in FIG. 9.

Figure 11:
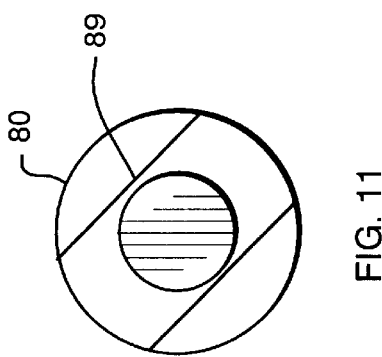
FIG. 11 shows a bottom view of the swivel pin of the actuator assembly.
Figure 10B:
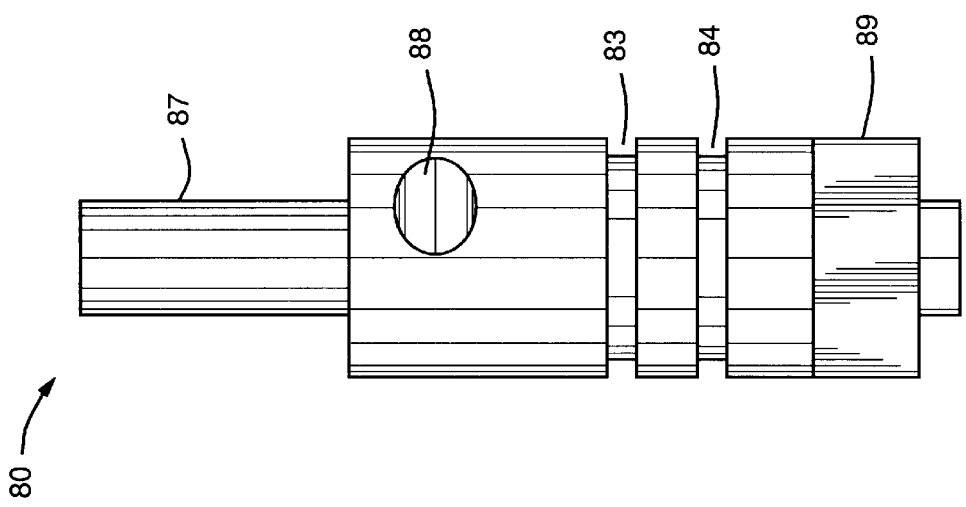
FIG. 10B shows a front elevational view of the swivel pin of the actuator assembly of FIG. 8 with the swivel pin rotated 180 degrees from the position in FIG. 10A showing the key at the bottom that inserts into the sectional gate.
Figure 10A:
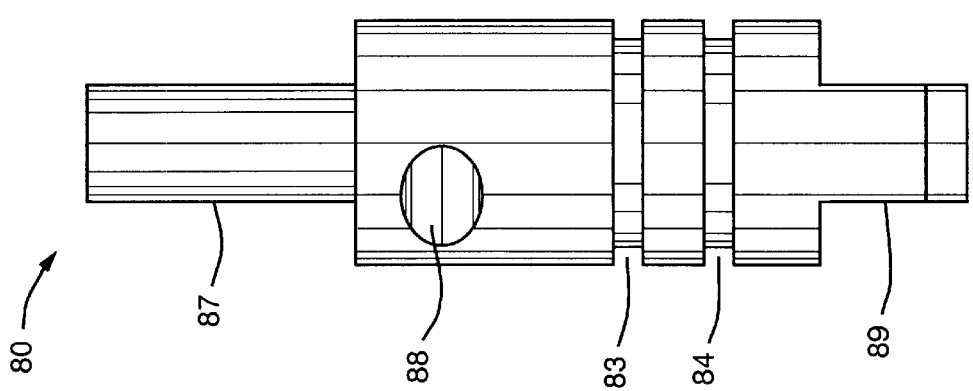
FIG. 10A shows a front elevational view of a swivel pin of the actuator assembly of FIG. 8.

Referring now to FIGS. 10A, 10B and 11, FIG. 10A shows a front elevational view of the swivel pin 80 showing the key 59 in a first position, which inserts into the sectional gate 50. FIG. 10B shows a front elevational view of the swivel pin 80 with the swivel pin rotated 180 degrees from the first position in FIG. 10A, showing an opposite side of the key 89. The swivel pin 80 comprises a slip hole 88 for insertion of the actuator rod 34. The grooves 83, 84 along the cylindrical wall of the swivel pin receive O-rings to prevent water in the housing 16 from getting into the gear box 30. FIG. 11 shows a bottom view of the swivel pin 80 showing the key 89.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A sectional gate valve comprising:
   means on an inlet section for connecting said valve to a fluid source;
   means on an outlet section of said valve for connecting said valve to a suction source;
   a sectional gate mounted inside said valve adjacent to said suction source connecting means, for controlling the flow of said fluid through said valve, said valve being dry when said valve is closed and connected to said suction source and not connected to said fluid source; and
   means positioned on the outside of said valve for adjusting the position of said sectional gate within the opening of said outlet section.

2. The sectional gate valve as recited in claim 1 wherein said means on said inlet section of said valve comprises a quick attachment coupling.

3. The sectional gate valve as recited in claim 1 wherein said means on said outlet section of said valve comprises a swivel nut for connection to said suction source.

4. The sectional gate valve as recited in claim 1 wherein said valve comprises an actuator section coupled to said sectional gate for opening and closing said sectional gate within said valve in accordance with said adjusting means on the outside of said valve.

5. The sectional gate valve as recited in claim 1 wherein said valve comprises a drain for releasing residual fluid when no hose is attached to said inlet section.

6. The sectional gate valve as recited in claim 1 wherein said valve comprises means attached to a portion of said valve for releasing pressure above a preset valve.

7. The sectional gate valve as recited in claim 4 wherein said actuator section comprises a gear box, attached to said valve, having a worm gear which rotates as a handwheel is turned.

8. The sectional gate valve as recited in claim 7 wherein said gear box comprises means for turning an indicator on the outside of said gear box, said gear box including a cover with markings whereby said indicator shows whether said valve is "open", "partially open" or "closed".

9. A sectional gate valve comprising:
   a main housing for providing a flow path for a fluid;
   an inlet section of said main housing comprises a coupling for attaching a hose;
   an outlet section of said main housing comprises a coupling for attaching said sectional gate valve to a pumping source;
   a sectional gate mounted in said main housing adjacent to said outlet section for opening and closing said flow path, said main housing being dry when said sectional gate is closed, said sectional gate valve is connected to said pumping source, and said sectional gate valve is not connected to said hose at said inlet section; and
   a gear box coupled to said sectional gate and mounted on said main housing for moving said sectional gate from an open to a closed position in response to a movement of a handwheel.

10. The sectional gate valve as recited in claim 9 wherein said sectional gate valve comprises a pressure relief section having a relief valve housing attached to said main housing.

11. The sectional gate valve as recited in claim 9 wherein said sectional gate comprises approximately a one-third section of a sphere.

12. The sectional gate valve as recited in claim 9 wherein said gear box comprises a cover having labeling to indicate said sectional gate status.

13. The sectional gate valve as recited in claim 9 wherein said outlet section comprises a swivel nut for connecting to said pumping source.

14. The sectional gate valve as recited in claim 9 wherein said main housing comprises a drain for releasing residual fluid when no hose is attached to said inlet section.

15. The sectional gate valve as recited in claim 9 wherein said gear box comprises a worm gear with an actuator nut traveling along said worm gear as said handwheel is turned.

* * * * *